United States Patent
Su et al.

(10) Patent No.: US 8,707,103 B2
(45) Date of Patent: Apr. 22, 2014

(54) DEBUGGING APPARATUS FOR COMPUTER SYSTEM AND METHOD THEREOF

(75) Inventors: Chia-Hung Su, Hsin-Tien (TW); Yu-Jen Chang, Hsin-Tien (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 443 days.

(21) Appl. No.: 13/023,745

(22) Filed: Feb. 9, 2011

(65) Prior Publication Data

US 2012/0159254 A1  Jun. 21, 2012

(30) Foreign Application Priority Data

Dec. 17, 2010 (TW) .............................. 99144377 A

(51) Int. Cl.
  *G06F 11/00* (2006.01)
(52) U.S. Cl.
  USPC .............................................................. 714/36
(58) Field of Classification Search
  USPC ......... 714/25–27, 30–32, 36, 37, 38.1, 38.13, 714/39, 44–46, 48, 57
  See application file for complete search history.

(56) References Cited

U.S. PATENT DOCUMENTS

| | | | | |
|---|---|---|---|---|
| 5,850,562 A * | 12/1998 | Crump et al. | ...................... | 713/1 |
| 6,862,695 B2 * | 3/2005 | Lin | ................................. | 714/36 |
| 6,910,157 B1 * | 6/2005 | Park et al. | ........................ | 714/36 |
| 8,060,733 B2 * | 11/2011 | Gao | .................................... | 713/1 |
| 2002/0144191 A1 * | 10/2002 | Lin | .................................. | 714/46 |
| 2010/0100769 A1 * | 4/2010 | Wu et al. | ......................... | 714/36 |

FOREIGN PATENT DOCUMENTS

CN  1432918 A  7/2003

OTHER PUBLICATIONS

English translation of abstract of CN 1432918 A, Jul. 30, 2003.

* cited by examiner

*Primary Examiner* — Nadeem Iqbal
(74) *Attorney, Agent, or Firm* — McClure, Qualey & Rodack, LLP

(57) ABSTRACT

The present invention relates to a debugging apparatus for a computer system and a method thereof. A detecting unit detects if a debugging unit connects to the computer system. When a debugging unit connects to the computer system, the detecting unit produces a detecting signal, which contains information of a bus in the computer system electrically connected with the debugging unit. Then a selection unit selects the bus electrically connected with the debugging unit according to the detecting signal. Besides, a testing unit tests the computer system and produces a power-on self-test (POST) code, so that the selected bus can be used for outputting the POST code to the debugging unit. Thereby, the present invention can choose to use the bus reserved in the computer system for outputting the POST code to the debugging unit, and hence facilitating inspection personnel to debug the computer system.

9 Claims, 4 Drawing Sheets

DEBUGGING APPARATUS FOR COMPUTER SYSTEM AND METHOD THEREOF

FIELD OF THE INVENTION

The present invention relates generally to a debugging apparatus and a method thereof, and particularly to a debugging apparatus for computer system and a method thereof.

BACKGROUND OF THE INVENTION

When a general computer system, for example, a desktop computer, a notebook computer, or an embedded computer, is started or reset, its basic input/output system (BIOS) will perform a power-on self-test (POST) on hardware apparatuses in and connected to the computer system. A general POST is executed by the BIOS before a computer system loads the operating system. The test includes testing if various parts of hardware in the computer system start normally or if there is any hardware not properly installed. If a computer system detects abnormality during POST, a so-called POST code is generated. Then according to the POST code, the debugging personnel can know which hardware encounters abnormal problems and thereby fixes the problem.

Regarding the generation of the POST code, in earlier technologies, the casing of the computer system has to be taken away. Then a debugging card is inserted to the motherboard for testing. This method is very time-consuming and inconvenient. Thereby, another method is developed afterwards. The method is applied for transmitting a POST code to a bus via system chips. Then inspection equipment connected to the bus is used for decoding and displaying the POST code. Currently, POST codes are mostly transmitted to low-pin-count (LPC) interface buses, Print ports (LPT), or COM ports via system chips. Then external inspection equipment is used for decoding and displaying the POST codes. In order to transmit the POST codes via the interfaces described above to the inspection equipment, it is necessary to reserve the ports for these interfaces. Because computer systems have to reserve the interface ports for debugging detection, extra space on motherboards is occupied. Nonetheless, people want to have lightweight and thin computer systems. Hence, the interface ports reserved for debugging purpose occupy too much space on motherboards.

Accordingly, there is a desire for a debugging apparatus for computer system and a method thereof, which to overcome the above shortcomings. Thereby, inspection personnel can more easily debug the computer system, and hence enhancing debugging efficiency.

SUMMARY

The present invention provides a debugging apparatus for computer system and a method thereof. When the debugging apparatus for computer system detects that a debugging unit is connected to the computer system, the debugging apparatus will select the bus electrically connecting with the debugging unit for outputting a POST code to the debugging unit. In other words, the bus generally reserved in a computer system is used for outputting POST codes to the debugging unit. Thereby, inspection personnel are convenient to debug a computer system.

The present invention provides a debugging apparatus for computer system, which comprises a testing unit, a detecting unit, and a selection unit. The testing unit is used for testing the computer system and producing a POST code correspondingly. The detecting unit detects if a debugging unit connects to the computer system. When a debugging unit connects to the computer system, the detecting unit produces a detecting signal, which contains information of a bus in the computer system electrically connected with the debugging unit. The selection unit selects the bus electrically connected with the debugging unit according to the detecting signal, so that the selected bus can be used for outputting the POST code to the debugging unit.

The present invention provides a debugging method for computer system. Firstly, detect if a debugging unit connects to the computer system and produce a detecting signal, which contains information of a bus in the computer system electrically connected with the debugging unit. Then, select the bus electrically connected with the debugging unit according to the detecting signal. Next, test the computer system and produce a POST code. Afterwards, output the POST code to the debugging unit via the selected bus.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
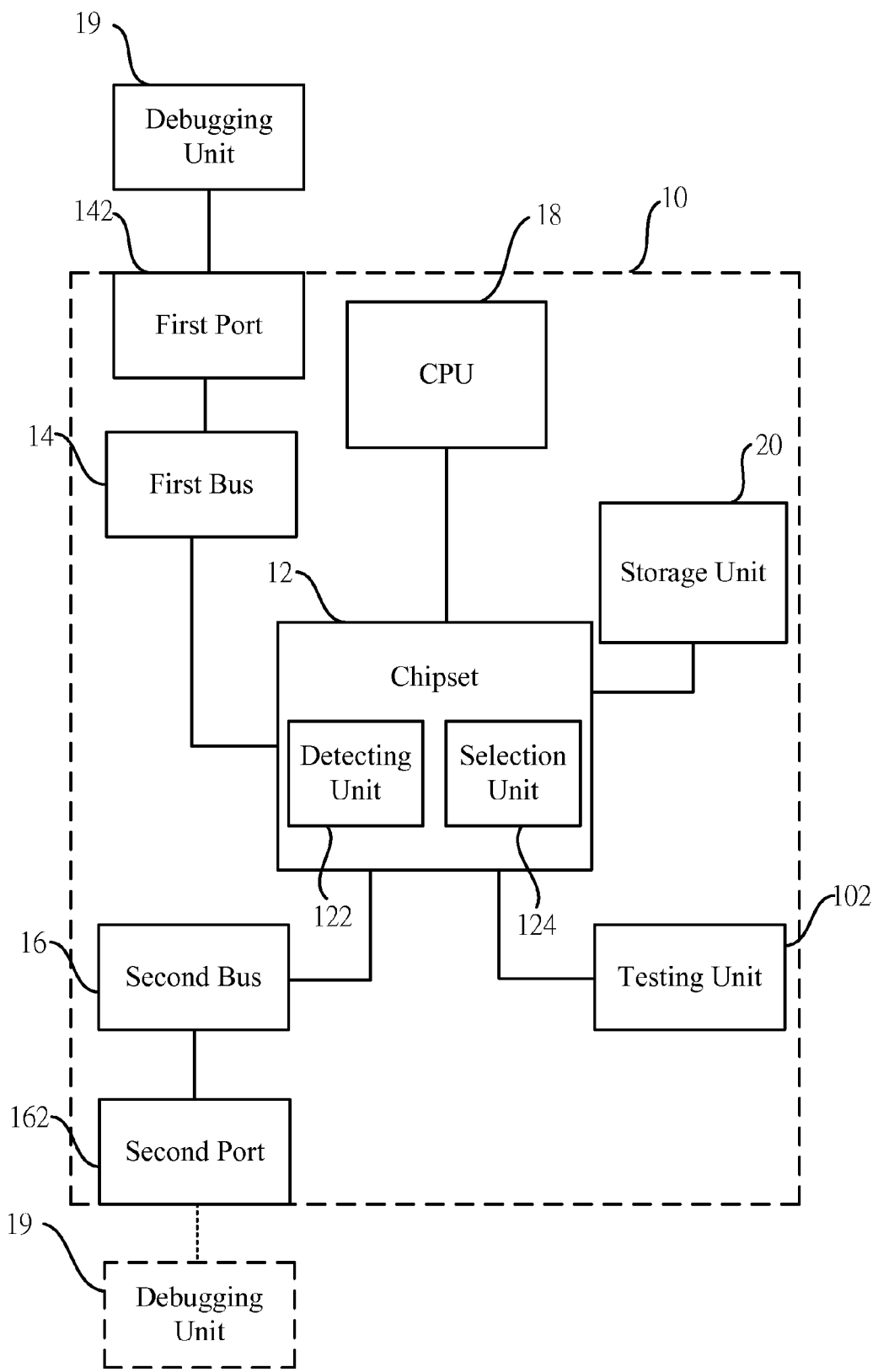
FIG. 1 shows a block diagram according to a preferred embodiment of the present invention.

FIG. 1 shows a block diagram according to a preferred embodiment of the present invention. As shown in the figure, the debugging apparatus according to the present invention is applied to a computer system 10. The computer system 10 comprises a chipset 12, a plurality of buses, a central processing unit (CPU) 18, and a storage unit 20. The computer system 10 according to the present invention includes various types of computer systems such as, but not limited to, desktop computers, notebook computers, or embedded computers. The debugging apparatus according to the present embodiment comprises a testing unit 102, a detecting unit 122, and a selection unit 124. The testing unit 102 may be the BIOS of the computer system 10. The detecting unit 122 and the selection unit 124 can be integrated in the chipset 12. Thereby, the chipset 12 according to the present embodiment includes, but not limited to, the detecting unit 122 and the selection unit 124. In addition, the chipset 12 includes an integrated south and north bridge chipset, or a corresponding south or north bridge chipset according to the property of buses. The detecting unit 122 and the selection unit 124 are disposed in the corresponding south or north bridge chipset.

A first bus 14 and a second bus 16 are used to describe the plurality of buses according to the present embodiment. Nevertheless, the present invention is not limited to the types and quantity of the buses. The first bus 14 and the second bus 16 according to the present embodiment connect to a corresponding first port 142 and a corresponding second port 162, respectively. The first bus 14 and the second bus 16 according to the present embodiment can be a PS/2 bus and a system management bus (SM bus) for display, respectively. These two buses are of different types. The first port 142 and the second port 162 are a PS/2 port and a display port, respectively. Besides, the display port can be, but not limited to, a video graphics array (VGA) port, a digital video interface (DVI) port, or a high-definition multimedia interface (HDMI®) port. The chipset 12 is connected with the CPU 18. The first bus 14, the second bus 16, and the storage unit 20 are connected to the chipset 12. In addition, according to an embodiment, the computer system 10 can have only one bus. For example, a notebook computer may have only one system management bus for display but no PS/2 bus. In this situation, in which the computer system 10 has only one system management bus for display, the bus can connect to the north bridge chipset or to the integrated south and north bridge chipset. According to another embodiment in which the computer system 10 has only one PS/2 bus, the bus can connect to the south chipset or to the integrated south and north bridge chipset.

The testing unit 102 is connected to the chipset 12. After the computer system 10 is turned on, the testing unit 102 performs POST. When the testing unit 102 detects abnormality during the POST, it will produce a POST code to the chipset 12 for outputting the POST code. After the testing unit 102 finishes the POST, an operating system stored in the storage unit 20 will be loaded to the CPU 18, enabling the computer system 10 to enter the operating environment provided by the operating system. The storage unit 20 according to the present embodiment can be, but not limited to, a hard disk, a flash disk, or a memory card; the operating system according to the present embodiment can be, but not limited to, Windows®, Linux®, or UNIX®. Moreover, the data format output by the testing unit 102 is compatible with the chipset 12 and its connected buses. Thereby, the testing unit 102 needs not to convert the transmission format of the POST code but outputs directly to the chipset 12, which is beneficial for the chipset 12 to output the POST code to the first bus 14 or the second bus 16 directly.

The detecting unit 122 detects the plurality of buses, namely, the first and second buses 14, 16 according to the present embodiment, of the computer system 10 for detecting if the debugging unit 19 is connected to the computer system 10 via the first bus 14 or the second bus 16. In other word, the detecting unit 122 detects if there is any external debugging unit 19 electrically connecting to the first port 142 or to the second port 162. The detecting unit 19 has independent device-tag data. Thereby, when the debugging unit 19 is electrically connected to the first bus 14 via the first port 142, the chipset 12 will receive the device-tag data of the debugging unit 19 via the first bus 14. Consequently, the detecting unit 122 according to the present invention knows that the detecting unit 19 has electrically connected to the first bus 14 according to the device-tag data and thus producing a detecting signal. The detecting signal contains information of the bus, such as the first bus 14 or the second bus 16, in the computer system 10 electrically connecting with the debugging unit 122.

For example, if the debugging unit 19 is a debugging card with the device-tag data of ID99. The debugging card according to the present embodiment includes a programmable chip (not shown in the figure), which can be a field-programmable gate array (FPGA), a complex programmable logic device (CPLD), or an 8051 chip. Thereby, when the debugging unit 19 is electrically connected to the first bus 14, the detecting unit 122 detects ID99 and produces the detecting signal, which means that the debugging unit 19 is electrically connecting to the first bus 14. Likewise, as the dashed line shown in FIG. 1, the debugging unit 19 is electrically connected to the second bus 16 via the second port 162. Hence, the chipset 12 will receive the device-tag data of the debugging unit 19. The detecting unit 122 will detect that the debugging unit 19 is electrically connected to the second bus 16 according to the device-tag data and thus producing the detecting signal. This means that the debugging unit 19 is electrically connected to the second bus 16.

After the selection unit 124 receives the detecting signal, it selects the first bus or the second bus 16 as the transmission bus according to the detecting signal in order to transmit the POST code produced by the testing unit 102 to the debugging unit 19. Besides, if the detecting unit 122 does not detect any bus 14, 16 connecting to the debugging unit 19, the selection unit 124 will not transmit the POST code via the first bus 14 or the second bus 16.

According to the description above, the testing unit 102 according to the present invention is the BIOS of the computer system 10, and the detecting unit 122 and the selection unit 124 according to the present invention can be integrated to the chipset 12. Thereby, it is not necessary to design another chip exclusively used for disposing the testing unit 102, the detecting unit 122, and the selection unit 124, and hence saving the circuit space in the computer system 10. That is to say, the BIOS and the chipset 12 having existed in the computer system 10 can be used directly to achieve the configuration of the present invention. In addition, the present invention selects the first or second bus 14, 16 reserved by the computer system 10 to output the POST code of the testing unit 102 to the debugging unit 19. Thereby, the debugging apparatus according to the present invention will not occupy extra circuit space of the computer system 10. In particular, the first bus 14 or the second bus 16 described above is the general PS/2 or system management bus for display. No extra bus exclusive for rarely-used testing is required.

Figure 2:
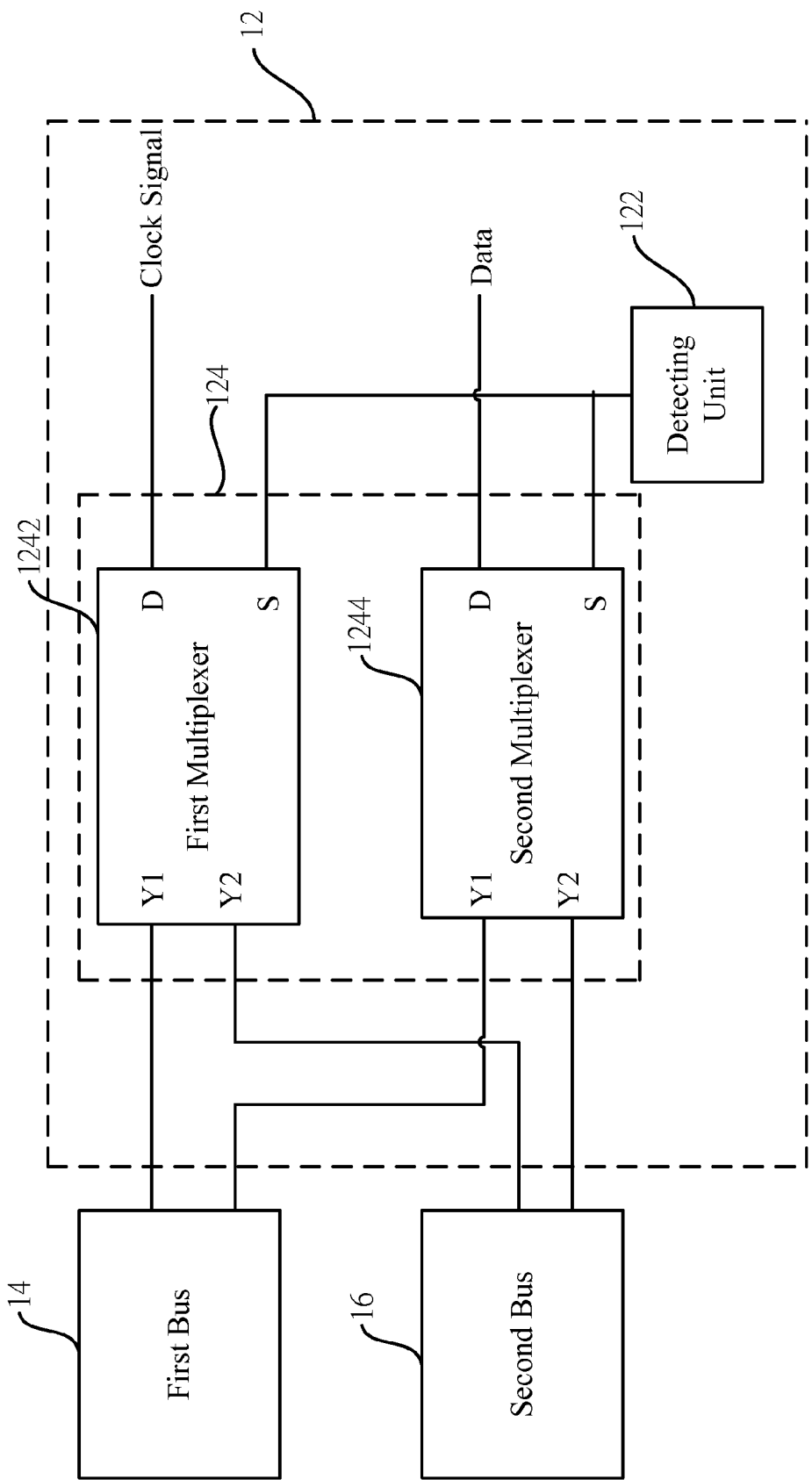
FIG. 2 shows a block diagram of a selection unit according to a preferred embodiment of the present invention.

FIG. 2 shows a block diagram of a selection unit according to a preferred embodiment of the present invention. As shown in the figure, the selection unit 124 according to the present invention includes a first multiplexer 1242 and a second multiplexer 1244. An input pin D of the first multiplexer 1242 is connected to the clock signal of the computer system 10. A select pin S of the first multiplexer 1242 is connected to an output of the detecting unit 122. A first output pin Y1 of the first multiplexer 1242 is connected to the first bus 14. A second output pin Y2 of the first multiplexer 1242 is connected to the second bus 16. An input pin D of the second multiplexer 1244 receives the data received by the chipset 12, which is the POST code produced by the testing unit 102 according to the present embodiment. A select pin S of the second multiplexer 1244 is connected to the output of the detecting unit 122. A first output pin Y1 of the second multiplexer 1244 is connected to the first bus 14. A second output pin Y2 of the second multiplexer 1244 is connected to the second bus 16.

Please also refer to FIG. 1. When the detecting unit 122 detects the debugging unit 19 is electrically connected to the first bus 14 via the first port 142, the detecting unit 122 produces the corresponding detecting signal, for example, a low-level voltage, to first and second multiplexers 1242, 1244. The first and second multiplexers 1242, 1244 output the clock signal, the POST code to the first bus 14 from their respective first output pins Y1 according to the low-level detecting signal. Likewise, when the debugging unit 19 is electrically connected to the second bus 16 via the second port 162, the detecting unit 122 produces the corresponding detecting signal, for example, a high-level voltage, to first and second multiplexers 1242, 1244 for driving them to output the clock signal, the POST code to the second bus 16 from their respective second output pins Y2. It is known from the above description that when the detecting unit 122 detects electrical connection of the debugging unit 19 to the first or second bus 14, 16 of the computer system 10, it will produce the corresponding detecting signal containing the information of the bus electrically connecting to the debugging unit 19. Thereby, the selection unit 124 can select and output the POST code to the first or second bus 14, 16 according to the detecting signal in order to provide the POST code to the debugging unit 19. According an embodiment, the computer system 10 may have only one bus. For example, a notebook computer may have only a system management bus for display but no PS/2 bus. In this circumstance, the detecting unit 122 will still detect which corresponding port is electrically connected to the debugging unit 19. The detecting unit 122 will produce the corresponding detecting signal to the first and second multiplexers 1242, 1244.

Figure 3:
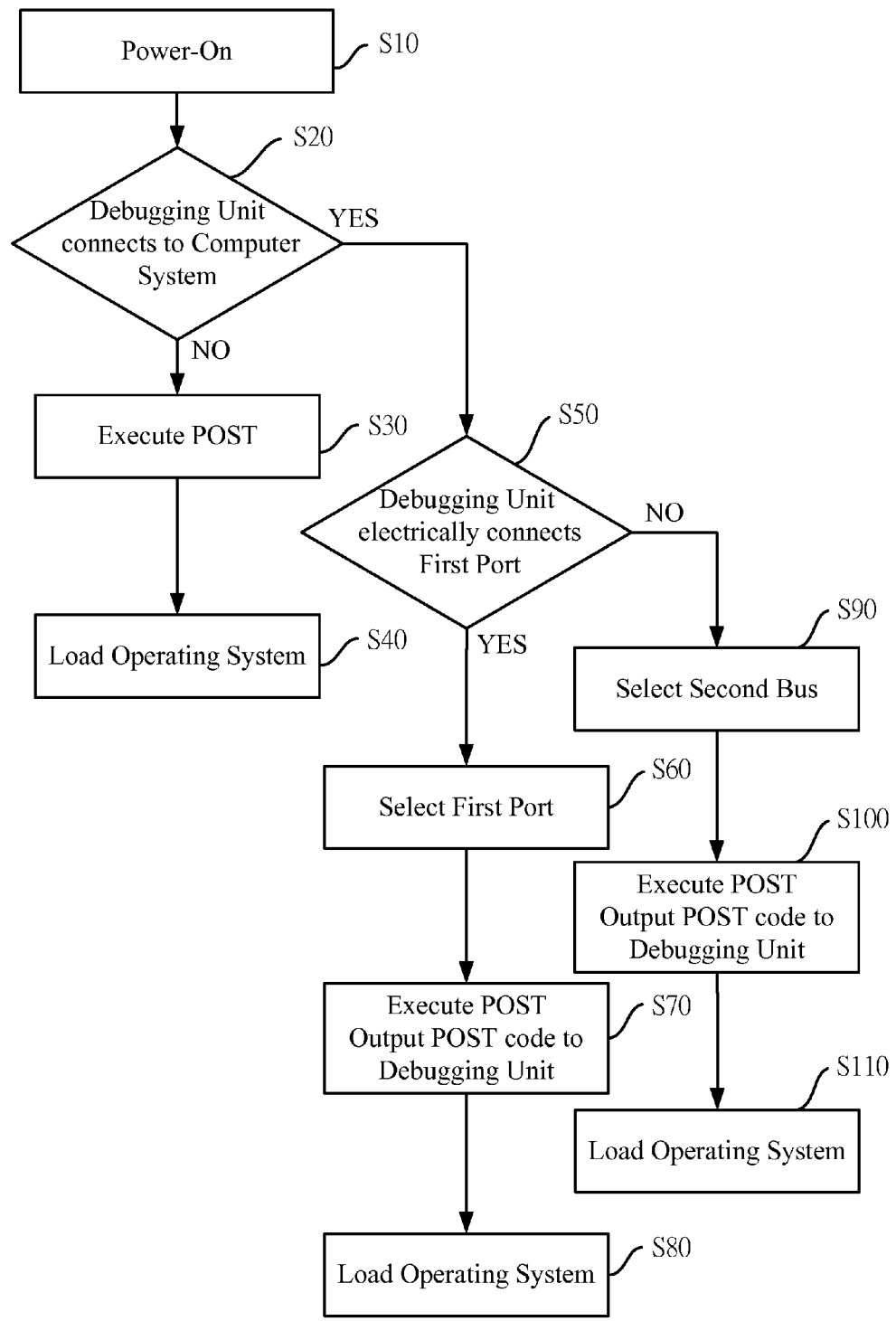
FIG. 3 shows a flowchart according to a preferred embodiment of the present invention.

FIG. 3 shows a flowchart according to a preferred embodiment of the present invention. As shown in the figure, the debugging method according to the present embodiment of the present invention is applied to the situation when a computer system starts, and a bus is selected for outputting the POST code according to the status in which the debussing unit connects to the computer system. First, as shown in the step S10, after the power of the computer system is turned on, the step S20 is executed for detecting if there is any debugging unit connecting to the computer system. An embodiment of this step is that the detecting unit detects if there is any debugging unit connecting to the bus via the port. If yes, the step S50 is executed; if not, the step S30. A first bus and a second bus are used as examples for describing the bus according to the present embodiment. The bus is, however, not limited to the first and second buses.

Next, as shown in the step S30, because no debugging unit is detected to connect to the bus of the computer system, the testing unit executes POST. According to the present embodiment, the testing unit is the BIOS in the computer system. Then, as shown in the steps S40, the testing unit loads the operating system, which, according to the present embodiment, can be, but not limited to, Windows®, Linux®, or UNIX®, stored in the storage unit of the computer system to the CPU after the POST.

After the detecting unit detects electrical connection of the debugging unit to the first or second bus via the port, the step S50 is executed, in which the detecting unit will detect if the bus to which the debugging unit electrically connects is the first port and produce the detecting signal correspondingly. In other words, the detecting signal contains the information of a bus (for example, the information of the first or second bus) in the computer system to which the debugging unit electrically connects. When the detecting result of the detecting unit shows that the debugging unit electrically connects to the first bus via the first port, the step S60 is then executed. When the detecting result of the detecting unit shows that the debugging unit does not electrically connect to the first bus but to the second bus via the second port, the steps S90 is executed. The first and second ports according to the present embodiment are PS/2 and display ports, respectively. The display port can be, but not limited to, a VGA, a DVI, or an HDMI® port. Besides, in certain circumstances, the whole system can have only one bus. Then the detecting unit still detects which corresponding port electrically connects to the debugging unit and executes the subsequent step.

Afterwards, as shown in the step S60, the selection unit selects the first bus as the data transmission path according to the detecting signal. As shown in the step S70, the testing unit executes the POST and outputs the POST code to the debugging unit via the first bus and the first port. Finally, as shown in the step S80, after the testing unit completes the POST, it loads the operating system to the CPU for execution. Likewise, as shown in the step S90, the selection unit selects the second bus as the data transmission path according to the detecting signal. As shown in the step S100, the testing unit executes the POST and outputs the POST code to the debugging unit via the second bus and the second port. Finally, as shown in the step S110, after the testing unit completes the POST, it loads the operating system to the CPU for execution.

It is known from the above description that according to the debugging method of the present invention, the POST code for debugging the computer system is transmitted to the debugging unit via the existed bus of the computer system. It is thereby not necessary to design another bus exclusively used for transmitting the POST code to the debugging unit. In addition, because the debugging unit is connected to the bus of the computer system externally, it is not required to take off the casing of the computer system for testing. Consequently, it is more convenient for debugging personnel to debug using the method according to the present invention.

Figure 4:
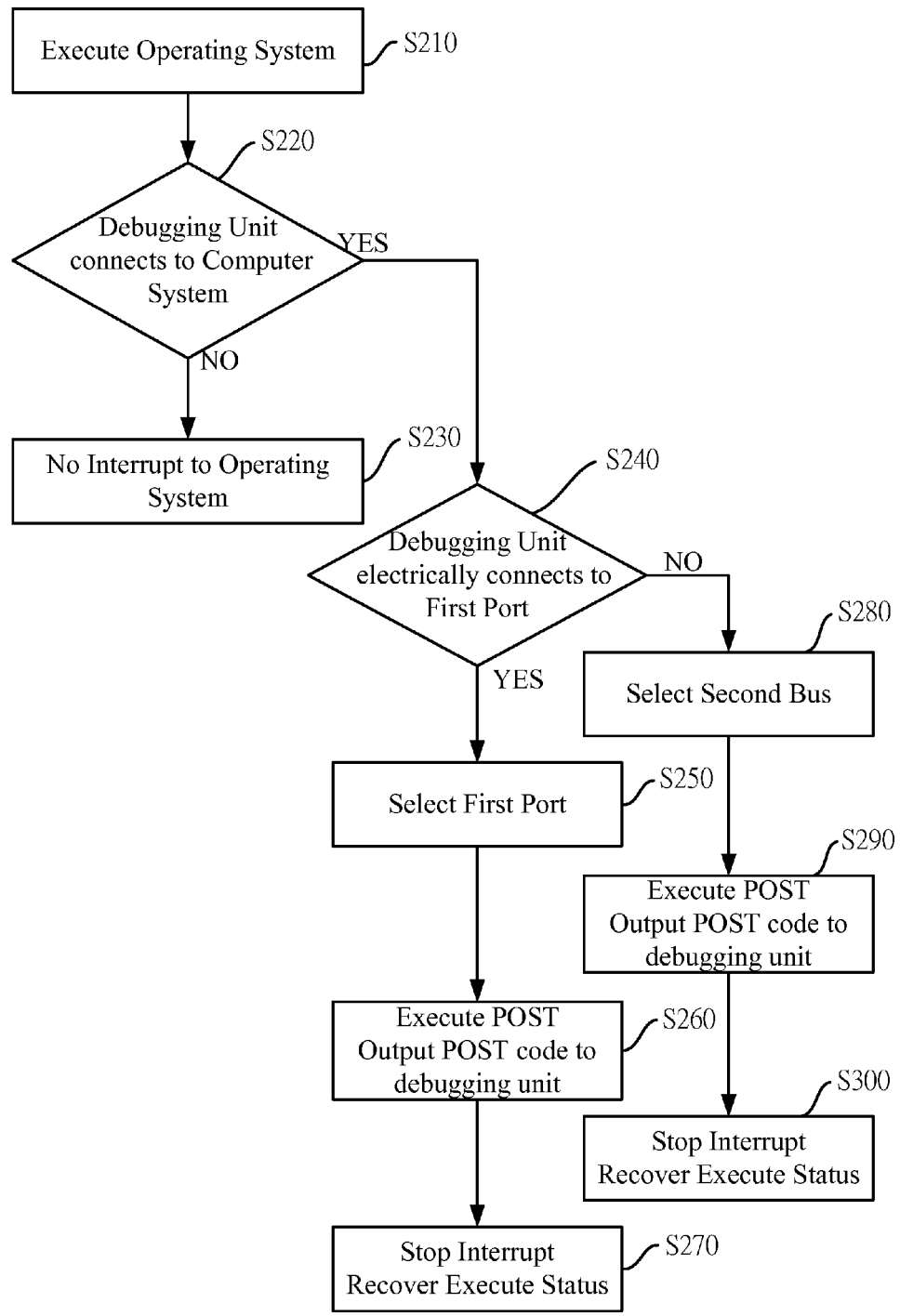
FIG. 4 shows a flowchart according to another preferred embodiment of the present invention.

FIG. 4 shows a flowchart according to another preferred embodiment of the present invention. The difference between FIG. 3 and FIG. 4 is that the embodiment according to the former is used for debugging during start-up of the computer system. On the other hand, FIG. 4 is used for debugging when abnormality occurs during the computer system executing the operating system. As shown in the figure, the debugging method for computer system according to the present embodiment can be further applied to the situation when abnormality occurs during the computer system running the operating system. Then the bus for outputting the POST code can be selected according to the status in which the debugging unit connects to the computer system. As shown in the step S210, when an executable program of the operating system is abnormal and has no response from the system, the steps S220 is followed for detecting if there is any debugging unit connecting to the computer system. An embodiment of the present step is that the detecting unit detects if there is any external debugging unit electrically connects to the bus via the port. When a debugging unit electrically connecting to the computer system is detected, the step S240 is executed; if not, the step S230. As shown in the step S230, because no debugging unit electrically connecting to the computer system via any port is detected, the computer system does not interrupt the operating system.

As shown in the step S240, because a debugging unit detects if the port to which the debugging unit connects is the first bus according to the device-tag data of the debugging unit. If it is detected that the debugging unit electrically connects to the first bus via the first port, the step S250 is executed; if it is detected that the debugging unit electrically connects to the second bus via the second port, the step S280 is executed. As shown in the step S250, the first port connecting with the first bus is selected as the data transmission path for transmitting data to the debugging unit. Next, the step S260 is executed, in which the CPU loads and executes a debug service routine and outputs the POST code to the debugging unit via the first port. Finally, as shown in the step S270, the debug service routine is stopped and the execution status before the interrupted computer system is recovered and hence returning to the operating system.

Likewise, as shown in the step S280, the second port connecting with the second bus is selected as the data transmission path for transmitting data to the debugging unit. Next, the step S290 is executed, in which the debug service routine is executed and the POST code is output to the debugging unit via the second port. Finally, as shown in the step S300, the debug service routine is stopped and the execution status before the interrupted computer system is recovered and hence returning to the operating system. Similarly, the whole computer system can have only one bus. Then the detecting unit still detects which corresponding port electrically connects to the debugging unit and executes the subsequent step.

It is known from the above description that the present invention uses the detecting unit to detect if there is any debugging unit connecting to the computer system, so that it can produce the corresponding detecting signal when the debugging unit connects to the computer system. The detecting signal contains the information of a bus in the computer system to which the debugging unit electrically connects. The selection unit selects the bus electrically connecting with the debugging unit. Then the testing unit of the computer system produces the POST code and outputs to the chipset. Thereby, the POST code can be output to the debugging unit via the bus selected by the selection unit. In addition, the POST code produced by the testing unit is compatible with the transmission format of the chipset and the system bus, which is the system bus of the computer system. Consequently, according to the embodiments of the present invention as described above, the POST code can be provided to the external debugging unit for direct access without the need of the any conversion mechanism. Hence, no format-converting step is required according the present invention.

To sum up, the present invention provides a debugging apparatus for computer system and a method thereof. The debugging apparatus comprises a testing unit, a detecting unit, and a selection unit. The detecting unit detects if a debugging unit connects to the computer system. When a debugging unit connects to the computer system, the detecting unit produces a detecting signal, which contains information of a bus in the computer system electrically connected with the debugging unit. The selection unit selects the bus electrically connected with the debugging unit according to the detecting signal, so that the selected bus can be used for outputting the POST code to the debugging unit. Thereby, the present invention can choose to output the POST code to the debugging unit via the bus reserved for the computer system. It is not required to take off the casing of the computer system. Instead, the POST code can be output to the external debugging unit via the selected bus electrically connected with the debugging unit, and hence enhancing debugging convenience.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A debugging apparatus for a computer system, comprising:
   a testing unit, testing said computer system and producing a power-on self-test code;
   a detecting unit, detecting if a debugging unit connects to said computer system, and producing a detecting signal containing information of one of a plurality of busses in said computer system to which said debugging unit electrically connects, wherein each bus of the plurality of busses is a different standard than the remaining busses; and
   a selection unit, selecting said bus of said computer system according to said detecting signal, and using said selected bus to output said power-on self-test code to said debugging unit;
   wherein said selection unit further comprises:
   a first multiplexer, receiving a clock signal; and
   a second multiplexer, receiving said power-on self-test code;
   where said first multiplexer and said second multiplexer output said clock signal and said power-on self-test code to said bus in said computer system according to said detecting signal.

2. The debugging apparatus of claim 1, wherein said plurality of busses includes a system management bus for display.

3. The debugging apparatus of claim 1, wherein said plurality of busses includes a PS/2 bus.

4. The debugging apparatus of claim 1, wherein said debugging unit electrically connects to one of the plurality of buses in said computer system; said detecting unit detects if said bus electrically connects to said debugging unit and produces said detecting signal; said selection unit selects said bus to which said debugging unit electrically connects according to said detecting signal; and power-on self-test code is output to said debugging unit via said bus.

5. The debugging apparatus of claim 1, wherein said detecting unit and said selection unit are integrated in a chipset.

6. A debugging method for a computer system, comprising steps of:
   detecting if a debugging unit connects to said computer system and producing a detecting signal containing the information of one of a plurality of busses in said computer system to which said debugging unit electrically connects, wherein each bus of the plurality of busses is a different standard than the remaining busses;
   selecting said bus in said computer system according said detecting signal, by a selection unit;
   testing said computer system and producing a power-on self-test code; and
   outputting said power-on self-test code to said debugging unit via said selected bus;
   wherein said selection unit further comprises:
   a first multiplexer, receiving a clock signal; and
   a second multiplexer, receiving said power-on self-test code;
   where said first multiplexer and said second multiplexer output said clock signal and said power-on self-test code to said bus in said computer system according to said detecting signal.

7. The debugging method of claim 6, wherein said plurality of busses includes a system management bus for display.

8. The debugging method of claim 6, wherein said plurality of busses includes a PS/2 bus.

9. The debugging method of claim 6, wherein said step of detecting if said debugging unit connects to said computer system further comprises steps of:
   detecting the plurality of buses in said computer system for detecting if said debugging unit electrically connects to one of said plurality of buses and producing said detecting signal; and
   selecting said bus to which said debugging unit electrically connects according to said detecting signal and outputting said power-on self-test code to said debugging unit via said bus.

* * * * *